(12) United States Patent
Raghavan et al.

(10) Patent No.: US 11,729,851 B2
(45) Date of Patent: Aug. 15, 2023

(54) BEAM FAILURE DETECTION WITH CARRIER AGGREGATION IN MILLIMETER WAVE SIDELINKS

(71) Applicant: QUALCOMM Incorporated, San Diego, CA (US)

(72) Inventors: Vasanthan Raghavan, West Windsor Township, NJ (US); Sony Akkarakaran, Poway, CA (US); Jung Ho Ryu, Fort Lee, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 17/304,197

(22) Filed: Jun. 16, 2021

(65) Prior Publication Data
US 2022/0039191 A1 Feb. 3, 2022

Related U.S. Application Data

(60) Provisional application No. 62/706,065, filed on Jul. 30, 2020.

(51) Int. Cl.
*H04W 76/19* (2018.01)
*H04W 36/30* (2009.01)
*H04W 72/044* (2023.01)
*H04W 72/0453* (2023.01)

(52) U.S. Cl.
CPC ......... *H04W 76/19* (2018.02); *H04W 36/305* (2018.08); *H04W 72/046* (2013.01); *H04W 72/0453* (2013.01)

(58) Field of Classification Search
CPC .............. H04W 76/19; H04W 36/305; H04W 72/0453; H04W 72/046; H04W 36/06; H04W 92/18; H04W 36/36; H04W 12/55; H04B 7/0695; H04B 17/318; H04L 5/001
See application file for complete search history.

(56) References Cited

U.S. PATENT DOCUMENTS

2020/0252990 A1\* 8/2020 Ganesan ................ H04W 76/19
2021/0136646 A1\* 5/2021 Tseng .................... H04L 5/0091
2021/0314053 A1\* 10/2021 Matsumura ........... H04L 27/261

FOREIGN PATENT DOCUMENTS

EP 3799330 A1 \* 3/2021 ........... H04B 7/0695

\* cited by examiner

*Primary Examiner* — Thai Nguyen
(74) *Attorney, Agent, or Firm* — Harrity & Harrity, LLP

(57) ABSTRACT

Various aspects of the present disclosure generally relate to wireless communication. In some aspects, a user equipment (UE) may communicate with another UE over a sidelink according to an inter-band carrier aggregation configuration. The inter-band carrier aggregation configuration may include one or more component carriers associated with a first frequency band and one or more component carriers associated with a second frequency band. The UE may perform beam failure detection for a first beam associated with the first frequency band and/or a second beam associated with the second frequency band based at least in part on independent beam failure detection reference signals that are configured for the first frequency band and the second frequency band. Numerous other aspects are provided.

30 Claims, 9 Drawing Sheets

US 11,729,851 B2

BEAM FAILURE DETECTION WITH CARRIER AGGREGATION IN MILLIMETER WAVE SIDELINKS

CROSS-REFERENCE TO RELATED APPLICATION

This Patent Application claims priority to U.S. Provisional Patent Application No. 62/706,065, filed on Jul. 30, 2020, entitled "BEAM FAILURE DETECTION WITH CARRIER AGGREGATION IN MILLIMETER WAVE SIDELINKS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam failure detection with carrier aggregation in millimeter wave (mmW) sidelinks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: communicating with another UE over a sidelink according to an inter-band carrier aggregation configuration, wherein the inter-band carrier aggregation configuration includes one or more component carriers associated with a first frequency band and one or more component carriers associated with a second frequency band; and performing beam failure detection for one or more of a first beam associated with the first frequency band or a second beam associated with the second frequency band based at least in part on independent beam failure detection reference signals that are configured for the first frequency band and the second frequency band.

In some aspects, a UE for wireless communication includes a memory and one or more processors, coupled to the memory, configured to: communicate with another UE over a sidelink according to an inter-band carrier aggregation configuration, wherein the inter-band carrier aggregation configuration includes one or more component carriers associated with a first frequency band and one or more component carriers associated with a second frequency band; and perform beam failure detection for one or more of a first beam associated with the first frequency band or a second beam associated with the second frequency band based at least in part on independent beam failure detection reference signals that are configured for the first frequency band and the second frequency band.

In some aspects, a non-transitory computer-readable medium storing a set of instructions for wireless communication includes: one or more instructions that, when executed by one or more processors of a UE, cause the UE to: communicate with another UE over a sidelink according to an inter-band carrier aggregation configuration, wherein the inter-band carrier aggregation configuration includes one or more component carriers associated with a first frequency band and one or more component carriers associated with a second frequency band; and perform beam failure detection for one or more of a first beam associated with the first frequency band or a second beam associated with the second frequency band based at least in part on independent beam failure detection reference signals that are configured for the first frequency band and the second frequency band.

In some aspects, an apparatus for wireless communication includes: means for communicating with a UE over a sidelink according to an inter-band carrier aggregation configuration, wherein the inter-band carrier aggregation configuration includes one or more component carriers associated with a first frequency band and one or more component carriers associated with a second frequency band; and means for performing beam failure detection for one or more of a first beam associated with the first frequency band or a second beam associated with the second frequency band based at least in part on independent beam failure detection reference signals that are configured for the first frequency band and the second frequency band.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
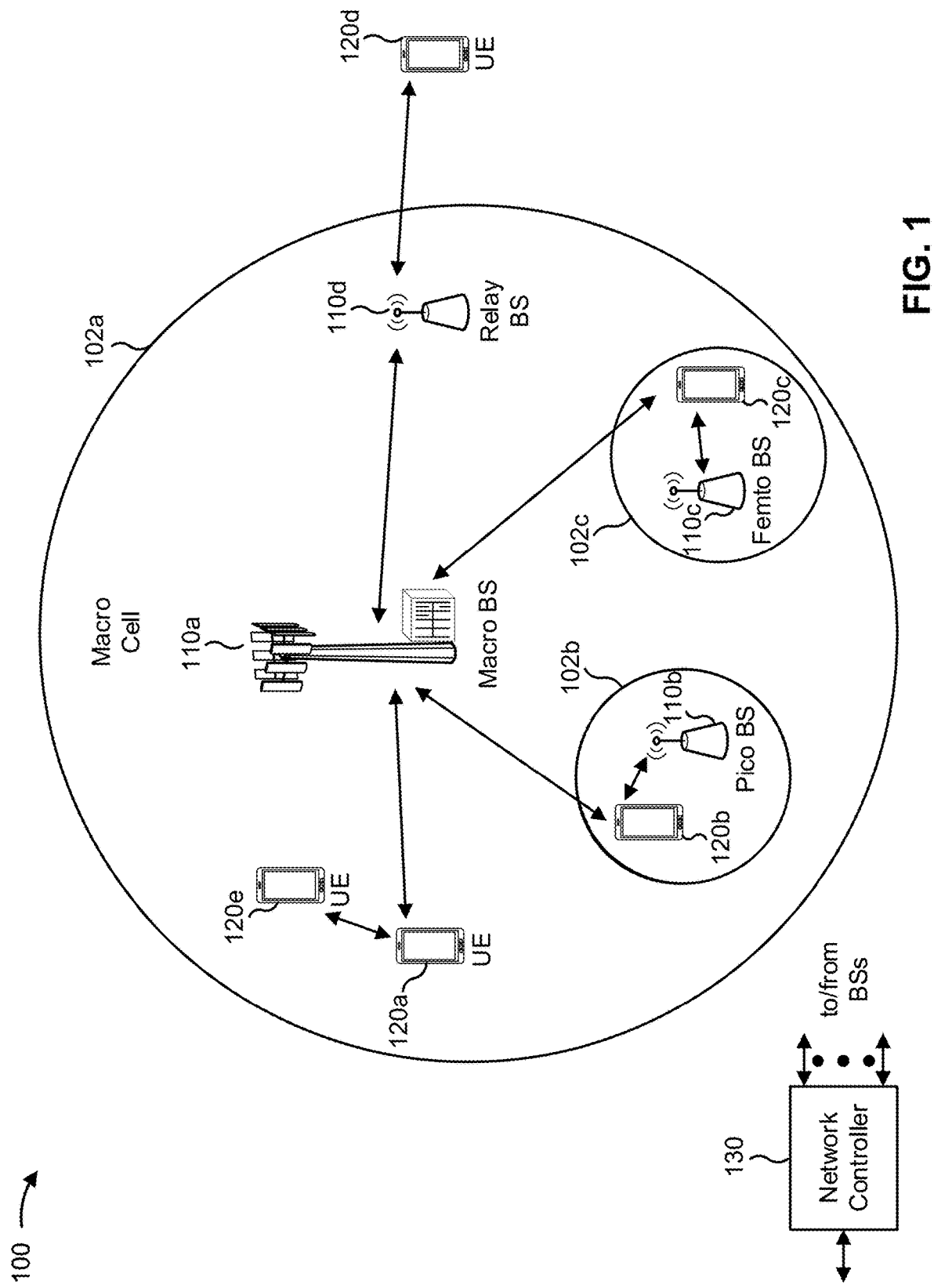
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz, may communicate using an operating band having a third frequency range (FR3), which may span from 7.125 GHz to 24.25 GHz, may communicate using an operating band having a fourth frequency range (FR4), which may span from 52.6

GHz to 114.25 GHz, may communicate using an operating band having a fifth frequency range (FR5), which may include frequencies higher than 114.25 GHz (e.g., sub-terahertz), and/or the like. Note that FR3 is between FR1 and FR2, and FR4 and FR5 are above FR2. The frequencies between FR1 and FR2 (e.g., in FR3) are sometimes referred to as mid-band frequencies or a "sub-centimeter wave" band. Although a portion of FR1 is greater than 6 GHz, FR1 is often referred to as a "sub-6 GHz" band. Similarly, FR2, FR4, and/or the like are often referred to as "millimeter wave" bands despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1, FR2, FR3, FR4, FR5, and/or the like may be modified, and techniques described herein are applicable to those modified frequency ranges.

As indicated above, FIG. 1 is provided as an example. Other examples may differ from what is described with regard to FIG. 1.

Figure 2:
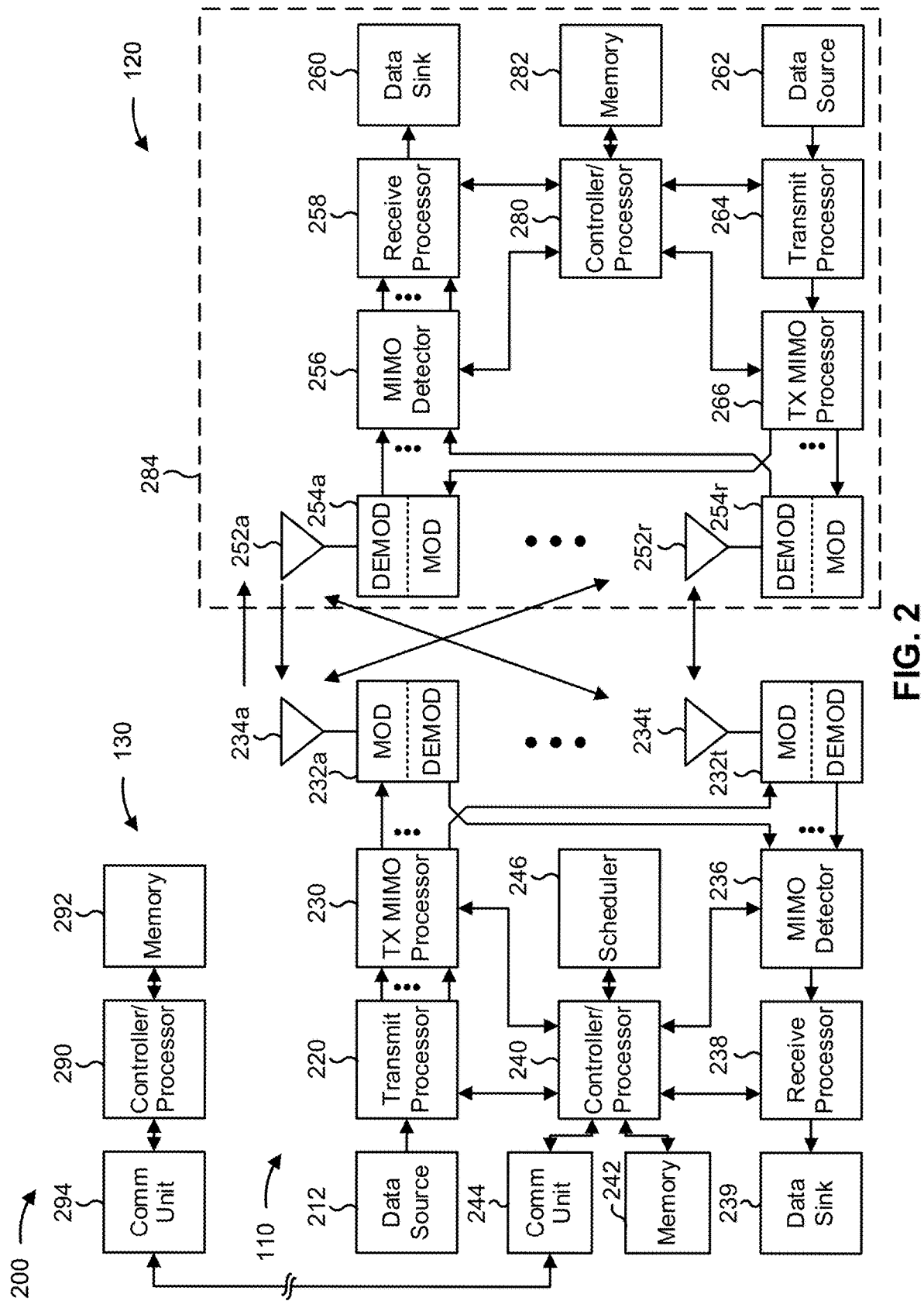
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIG. 6, FIGS. 7A-7B, and/or FIG. 8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIG. 6, FIGS. 7A-7B, and/or FIG. 8).

Controller/processor 240 of base station 110, controller/processor 280 of UE 120, and/or any other component(s) of FIG. 2 may perform one or more techniques associated with beam failure detection with carrier aggregation in millimeter wave (mmW) sidelinks, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8 and/or other processes as described herein. In some aspects, executing instructions may include running the instructions, converting the instructions, compiling the instructions, and/or interpreting the instructions, among other examples.

In some aspects, UE 120 may include means for communicating with another UE 120 over a sidelink according to an inter-band carrier aggregation configuration that includes one or more component carriers associated with a first frequency band and one or more component carriers associated with a second frequency band, means for performing beam failure detection for one or more of a first beam associated with the first frequency band or a second beam associated with the second frequency band based at least in part on independent beam failure detection reference signals that are configured for the first frequency band and the second frequency band, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
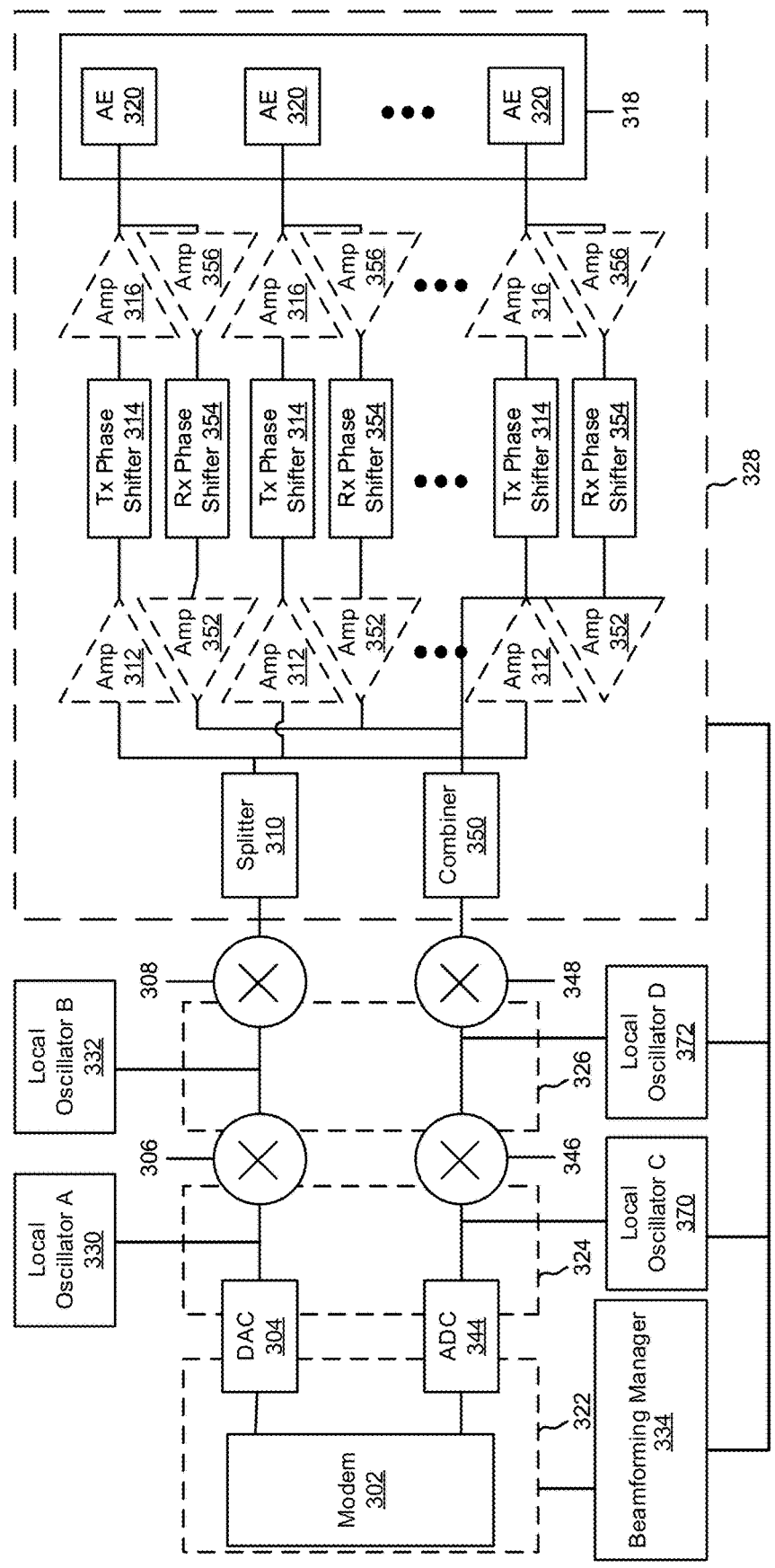
FIG. 3 is a diagram illustrating an example beamforming architecture that supports beamforming for millimeter wave (mmW) communications, in accordance with the present disclosure.

FIG. 3 is a diagram illustrating an example beamforming architecture 300 that supports beamforming for millimeter wave (mmW) communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a beamforming manager 334.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the beamforming manager 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the beamforming manager 334) to provide independent control of the gain for each antenna element 320. For example, the modem 302 and/or the beamforming manager 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the beamforming manager 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the beamforming manager 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, the splitter 310, the amplifiers 312, 316, or the phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the beamforming manager 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The beamforming manager 334 may be located partially or fully within one or more other components of the architecture 300. For example, the beamforming manager 334 may be located within the modem 302 in some aspects.

As indicated above, FIG. 3 is provided as an example. Other examples may differ from what is described with regard to FIG. 3.

Figure 4:
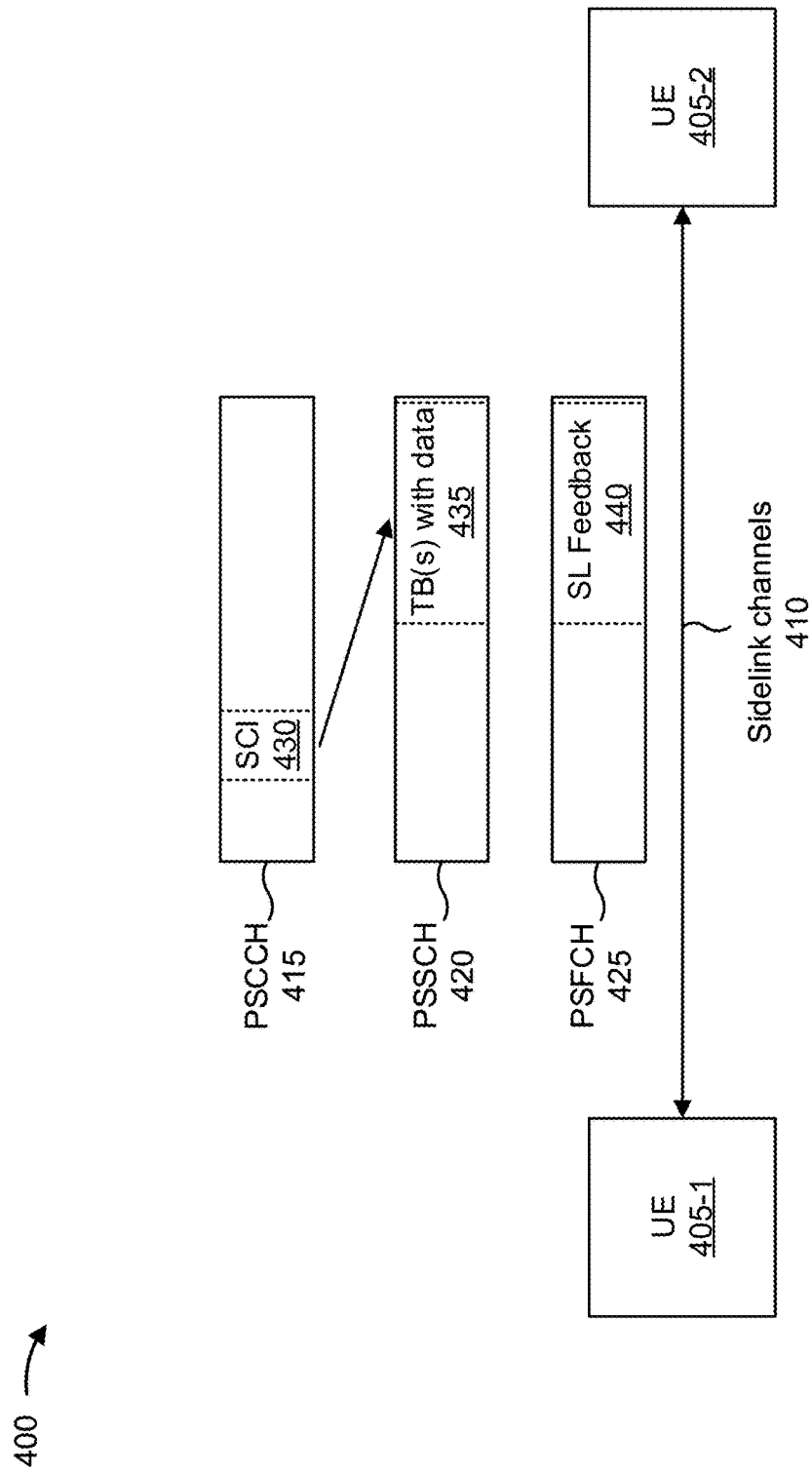
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, V2P communications, and/or the like), mesh networking, and/or the like. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the one or more sidelink channels 410 may be associated with a carrier aggregation configuration, such as intra-band carrier aggregation configuration that bonds multiple channelizations, an inter-band carrier aggregation configuration that includes component carriers in different frequency bands and/or different frequency ranges (e.g., across 28 GHz, 39 GHz, 60 GHz, and/or other frequencies), and/or the like. Additionally, or alternatively, the UEs 405 may synchronize timing of transmission time intervals (TTIs) (e.g., frames, subframes, slots, symbols, and/or the like) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, spatial resources, and/or the like) where a transport block (TB) 435 may be carried on the PSSCH 420. The TB 435 may include data. The PSFCH 425 may be used to communicate sidelink feedback 440, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a transmission mode where resource selection and/or scheduling is performed by the UE 405 (e.g., rather than a base station 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources, channel parameters, and/or the like. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, an MCS to be used for the upcoming sidelink transmission, and/or the like. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
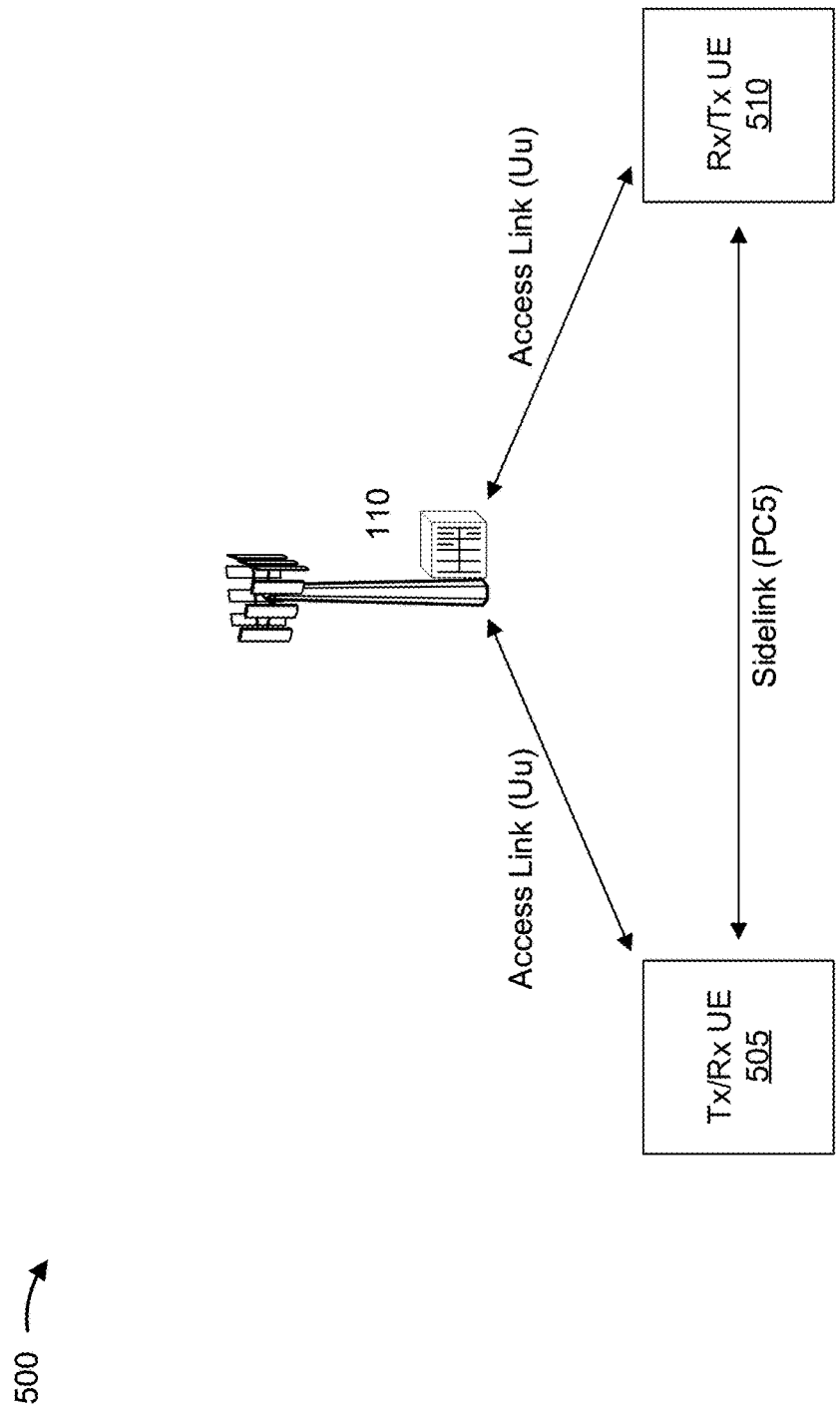
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, the base station 110, the Tx/Rx UE 505, and the Rx/Tx UE 510 may operate in a radio access network (RAN) that supports communication in the millimeter wave (mmW) spectrum using directional communication (e.g., beamforming, precoding, and/or the like). For example, mmW communications may be performed in Frequency Range 2 (FR2), which includes frequency bands from 24.25 GHz to 52.6 GHz, in Frequency Range 4 (FR4), which includes frequency bands from 52.6 GHz to 114.25 GHz, and/or the like, as compared to Frequency Range 1 (FR1), which includes sub-6 GHz frequency bands and may operate in a range of approximately 450 MHz to 7.125 GHz. In general, mmW communications in FR2, FR4, and/or the like may be associated with higher data rates than FR1, which may enable services that have high performance requirements (e.g., gaming, streaming high-resolution video, and/or the like). Accordingly, in some aspects, the wireless access link between the base station 110 and the Tx/Rx UE 505 and/or the wireless access link between the base station 110 and the Rx/Tx UE 510 may use mmW signals and/or may be directed toward a target wireless node (e.g., a UE and/or a base station). Furthermore, in some aspects, sidelink communications between the Tx/Rx UE 505 and the Rx/Tx UE 510 may be performed using mmW technology and/or beamforming such that the Tx/Rx UE 505 and the Rx/Tx UE 510 may direct or otherwise steer one or more transmissions toward one another by applying different weighting patterns at different transmit antennas and/or may receive transmissions from a particular direction by using different weighting patterns to amplify a signal received at different receive antennas. Accordingly, mmW communications offer various advantages, such as increased data rates, improved radio performance, increased throughput and reliability, and/or the like.

Furthermore, in some cases, the Tx/Rx UE 505 and/or the Rx/Tx UE 510 may be configured to operate according to a carrier aggregation configuration to enable increased bandwidth, increased throughput, increased reliability, and/or the like. For example, carrier aggregation generally enables two or more component carriers (sometimes referred to as carriers) to be combined (e.g., into a single channel) for a UE to enhance data capacity. For example, component carriers can be combined in the same frequency band, in different frequency bands, in the same frequency range, in different frequency ranges, and/or the like. Additionally, or alternatively, contiguous or non-contiguous component carriers can be combined. For example, carrier aggregation may be configured for a UE in an intra-band contiguous mode (e.g., where the aggregated component carriers are contiguous to one another and are in the same frequency band), in an intra-band non-contiguous mode (e.g., the aggregated component carriers are in the same frequency band and are non-contiguous to one another), an inter-band mode (e.g., the aggregated component carriers are non-contiguous to one another and are in different frequency bands and/or different frequency ranges).

In a wireless network that supports communication in the mmW spectrum, mmW frequency ranges (e.g., FR2, FR4, and/or the like) may support both intra-band carrier aggregation and inter-band carrier aggregation. For example, in the mmW spectrum, intra-band carrier aggregation may bond or otherwise aggregate multiple channelizations within a particular frequency range, while inter-band carrier aggregation may use component carriers or other frequency components (e.g., bandwidth parts or other frequency-related assignments) across different frequency bands and/or frequency ranges (e.g., 28 GHz, 39 GHz, 60 GHz, and/or the like). For example, an inter-band carrier aggregation configuration in the mmW spectrum may include two or more component carriers in different frequency bands within FR2, two or more component carriers in different frequency bands within FR4, at least one component carrier in FR2 and at least one component carrier in FR4, and/or the like. While inter-band carrier aggregation can enable various high-performance use cases, inter-band carrier aggregation poses various challenges with respect to beam management because mmW signals have a higher frequency and a shorter wavelength than various other radio waves used for communications (e.g., sub-6 GHz communications), whereby mmW signals may have shorter propagation distances, may be subject to atmospheric attenuation, may be more easily blocked and/or subject to penetration loss through objects or other obstructions compared to other types of radio waves, and/or the like.

For example, when beamforming is used to communicate in the mmW spectrum, a transmitting device may generate a transmit beam, and a receiving device may generate a corresponding receive beam. The transmit beam may be reflected, diffracted, scattered, and/or the like by one or more clusters, obstacles, materials, and/or the like within an environment between or around the transmitting and receiving devices. For example, as used herein, the term "cluster" may generally refer to objects in the channel environment through which energy propagates. Example clusters in mmW channel environments may include reflectors such as lamp posts, vehicles, glass/window panes, metallic objects, and/or the like, diffractors such as edges or corners of buildings, walls, and/or the like, and/or scattering via irregular objects such as walls, human bodies (e.g., a hand blocking an antenna module when a device is operated in a gaming mode), and/or the like.

In inter-band carrier aggregation contexts, when penetration loss, blockage, or other environmental factors cause a disruption or impairment to a beam associated with one component carrier, there may be a differential degradation in signal strength for a beam associated with another component carrier. For example, because FR4 generally includes higher frequencies than FR2, the degradation or impairment may be worse for component carriers in FR4 relative to component carriers in FR2 (e.g., a beam failure in FR2 is likely to also indicate a beam failure in FR4, but a beam failure in FR4 may not indicate a beam failure in FR2). Accordingly, when inter-band carrier aggregation and beamforming are used in mmW spectrum, beams associated with different frequency bands or different frequency ranges may be subject to different channel properties even when the beams are pointing in the same direction, which significantly complicates beam management processes such as beam selection, beam failure detection, beam failure recovery, and/or the like.

Some aspects described herein relate to techniques and apparatuses to perform beam failure detection when inter-band carrier aggregation is used in a mmW sidelink. More generally, some aspects described herein may enable beam failure detection when inter-band carrier aggregation is used between two wireless nodes that communicate using the mmW spectrum (e.g., on a sidelink, an access link, and/or the like). For example, in some aspects, a UE may communicate with a base station over an access link or with another UE over a sidelink according to an inter-band carrier aggregation configuration. The inter-band carrier aggregation configuration may include one or more component carriers associated with a first frequency band and one or more component carriers associated with a second frequency band.

The UE may perform beam failure detection for a first beam associated with the first frequency band and/or a second beam associated with the second frequency band based at least in part on independent beam failure detection reference signals that are configured for the first frequency band and the second frequency band. Additionally, or alternatively, beam failure detection may be performed in a bi-directional or on-demand manner across different frequency bands, different frequency ranges, and/or the like. For example, when a beam failure is detected in a first frequency band or a first frequency range, a beam failure detection process may be initiated on-demand in another frequency band or another frequency range. Furthermore, the inter-band carrier aggregation configuration may limit or restrict usage of a higher frequency band or a higher frequency range that is more sensitive to penetration loss or blockage, and communication via the higher frequency band or the higher frequency range may be enabled on-demand when one or more triggering conditions are satisfied. In this way, a UE may communicate in the mmW spectrum using an inter-band carrier aggregation configuration to enable higher data rates, improve spectral efficiency, and/or the like, and beam failure detection may be coordinated across different frequency bands and/or frequency ranges according to the different channel properties that may exist in the different frequency bands and/or frequency ranges.

As indicated above, FIG. 5 is provided as an example. Other examples may differ from what is described with respect to FIG. 5.

Figure 6:
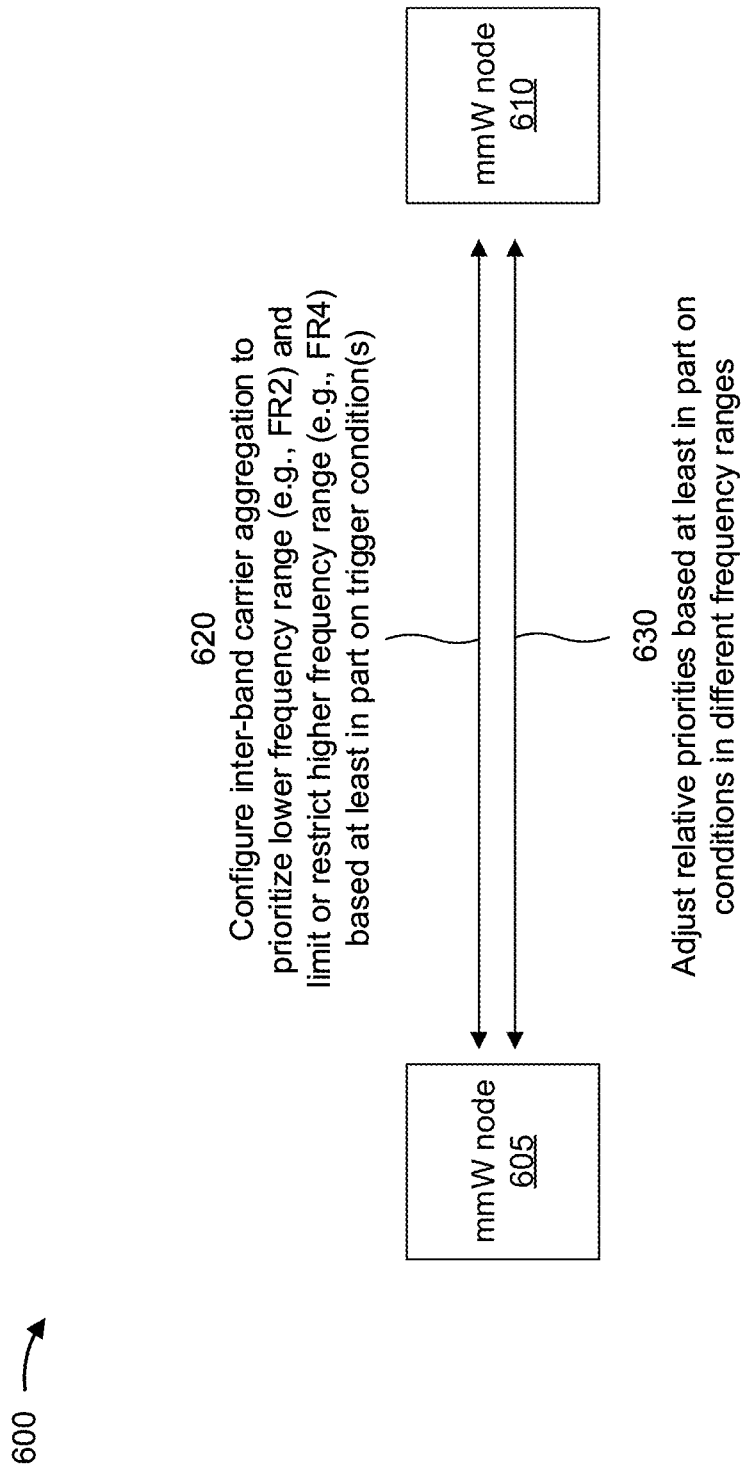
FIG. 6 is a diagram illustrating an example associated with beam failure detection with carrier aggregation in mmW sidelinks, in accordance with the present disclosure.

FIG. 6 is a diagram illustrating an example 600 associated with beam failure detection with carrier aggregation in mmW sidelinks, in accordance with the present disclosure. As shown in FIG. 6, example 600 includes a first mmW node 605 and a second mmW node 610 communicating in a wireless network (e.g., wireless network 100). In some aspects, the mmW nodes 605, 610 may correspond to a UE and a base station communicating over an access link, or the mmW nodes 605, 610 may correspond to two UEs communicating over a sidelink.

In general, as described herein, the mmW nodes 605, 610 may be configured to communicate according to an inter-band carrier aggregation configuration that includes one or more component carriers associated with a first frequency band and one or more component carriers associated with a second frequency band. For example, in some aspects, each frequency band may correspond to an entire frequency range (e.g., FR2 or FR4), a set of one or more frequencies within a frequency range, and/or the like. Furthermore, the mmW nodes 605, 610 may communicate over a beamformed link, which may include a first beam associated with the one or more component carriers in the first frequency band, a second beam associated with the one or more component carriers in the second frequency band, and/or the like. Accordingly, the first beam and the second beam may be subject to different channel properties even when the first beam and the second beam are steered toward the same or similar clusters in a channel, and a variation in the channel properties associated with the different beams may depend on a separation or distance between the component carrier(s) in the first frequency band and the component carrier(s) in the second frequency band.

For example, in cases where the first frequency band and the second frequency band correspond to different frequency ranges or sets of frequencies in different frequency ranges, such as FR2 and FR4, a coherence bandwidth in FR4 (e.g., an approximate maximum bandwidth or frequency interval over which two frequencies of a signal are likely to experience comparable or correlated amplitude fading) may be up to ten (10) times higher than a coherence bandwidth in FR2 (e.g., a 100 nanosecond delay spread in FR2 versus a 10 nanosecond delay spread in FR4). As a result, a beam in FR4 may experience just a single fade across a whole component carrier (e.g., 100 MHz) relative to a one component carrier setting in FR2. Furthermore, to maintain a similar diversity level (e.g., the same block error rate), an inter-band carrier aggregation configuration that includes two or more component carriers in different frequency bands of FR2 may need less time diversity than an inter-band carrier aggregation configuration that includes one or more component carriers in FR2 and one or more component carriers in FR4. Inter-band carrier aggregation configurations that use component carriers in different frequency ranges may therefore need to use more time resources, which can lead to higher latencies, lower reuse factors, and/or the like.

Accordingly, while a cluster in a first frequency range (e.g., FR2) is likely to also be a cluster in a second frequency range (e.g., FR4) and vice versa, there are certain circumstances in which inter-band carrier aggregation within a single frequency range offers better performance (e.g., more reliability, lower latency, and/or the like). For example, in a pre-impairment scenario, two beams associated with component carriers in different frequency ranges that are steered toward the same cluster may have similar beamforming gains (in decibels (dB)). However, if an impairment occurs (e.g., a user places a hand over an antenna module while gaming), the beamforming gain is likely to be degraded to a larger extent for the beam associated with the higher frequency range (e.g., due to the shorter wavelength). For example, an impairment that causes a 5 dB loss or degradation for a beam in FR2 may cause a 10 dB loss or degradation for a beam in FR4, and the 5 dB differential degradation may impact a viability of performing carrier aggregation using different component carriers within FR2 or using different component carriers across FR2 and FR4. Accordingly, in some aspects, inter-band carrier aggregation may be configured in a manner to enable the mmW nodes 605, 610 to switch between communicating using two or more component carriers in different frequency bands of a single frequency range (e.g., inter-band carrier aggregation within a frequency range) and communicating using component carriers in different frequency ranges (e.g., inter-band carrier aggregation across frequency ranges).

Accordingly, as shown in FIG. 6, and by reference number 620, the mmW nodes 605, 610 may configure inter-band carrier aggregation to prioritize a lower frequency range (e.g., FR2) and to limit or restrict usage of a higher frequency range (e.g., FR4). For example, in some aspects, the mmW nodes 605, 610 may prioritize the use of inter-band carrier aggregation using multiple component carriers within the lower frequency range such that use of inter-band carrier aggregation using one or more component carriers in the lower frequency range and one or more component carriers in the higher frequency range occurs only when needed and/or when certain trigger conditions exist. For example, a coherence bandwidth is generally inversely proportional to a delay spread within a frequency band, a frequency range, and/or the like. Thus, because a delay spread in a lower frequency range may be significantly higher than a delay spread in a higher frequency range (e.g., 100 nanodseconds in FR2 versus 10 nanoseconds in FR4), the coherence bandwidth in the higher frequency range may be significantly higher than the coherence bandwidth in the lower frequency range.

As a result, an impairment (e.g., blockage within a channel) may cause a single fade in the higher frequency band because the coherence bandwidth may cover the entire component carrier, but the impairment may cover only a fraction of the component carrier in the lower frequency band. In other words, the fading may be averaged out over multiple component carriers in the lower frequency band, whereas the fading may be concentrated within a single component carrier in the higher frequency band. This may result in unpredictable quality in the higher frequency band depending on whether the fading is concentrated in a component carrier that the mmW nodes 605, 610 are configured to use to communicate (in which case the channel quality may be very poor) or in another component carrier other than the component carrier that the mmW nodes 605, 610 are configured to use to communicate (in which case the channel quality may be very high).

Accordingly, in some aspects, the mmW nodes 605, 610 may generally prioritize inter-band carrier aggregation in a lower frequency band (e.g., FR2+FR2) over inter-band carrier aggregation between the lower frequency band and a higher frequency band (e.g., FR2+FR4) such that inter-band carrier aggregation between the lower frequency band and the higher frequency band is only used when needed. For example, in some aspects, the mmW nodes 605, 610 may enable inter-band carrier aggregation in the lower frequency band and may disable inter-band carrier aggregation between the lower frequency band and the higher frequency band. For example, the mmW nodes 605, 610 may communicate using multiple component carriers in the lower frequency band in cases where multiple component carriers are available for inter-band carrier aggregations in the lower frequency band, when user loading in the lower frequency band fails to satisfy (e.g., is less than or equal to) a threshold, when the mmW nodes 605, 610 have a need for low latency (e.g., for ultra-reliable low latency communication (URLLC)), when there is a need for a high frequency reuse factor (e.g., a rate at which the same frequency is used in a wireless network) to increase coverage and capacity, and/or the like. Additionally, or alternatively, a lower priority may be assigned to inter-band carrier aggregation between the lower frequency band and a higher frequency band relative to inter-band carrier aggregation within the lower frequency band in cases where an aggregated bandwidth is the same for both cases (e.g., where an aggregated bandwidth associated with an FR2+FR2 inter-band carrier aggregation configuration is the same as an aggregated bandwidth associated with an FR2+FR4 inter-band carrier aggregation configuration).

As further shown in FIG. 6, and by reference number 630, the mmW nodes 605, 610 may adjust the relative priorities of the inter-band, intra-range carrier aggregation configuration (e.g., FR2+FR2) and the inter-band, inter-range carrier aggregation configuration (e.g., FR2+FR4) based at least in part on conditions in the different frequency ranges. For example, as described above, the higher frequency range may generally offer better data rates than the lower frequency range, whereby communication via the higher frequency range may be needed to enable certain use cases that have high bandwidth demands (e.g., gaming, streaming high-quality video, and/or the like). Accordingly, when the inter-band, inter-range carrier aggregation configuration is assigned a relatively low priority or is otherwise restricted or limited (e.g., disabled), the inter-band, inter-range carrier aggregation configuration may be enabled or assigned a relatively higher priority when certain triggering conditions are satisfied. For example, in some aspects, the mmW nodes 605, 610 enable or assign a relatively higher priority to the inter-band, inter-range carrier aggregation configuration in cases where multiple component carriers in the lower frequency range are not available (e.g., inter-band, intra-range carrier aggregation cannot be enabled in the lower frequency range), where a user loading in the lower frequency range satisfies (e.g., equals or exceeds) a threshold, and/or the like. Additionally, or alternatively, the inter-band, inter-range carrier aggregation configuration may be enabled or prioritized when communication between the mmW nodes 605, 610 is associated with a relaxed latency requirement, where there is no need to enable a higher frequency reuse factor in the wireless network, when the inter-band, inter-range carrier aggregation configuration offers a larger aggregated bandwidth than the inter-band, intra-range carrier aggregation configuration, and/or the like. In this way, the mmW nodes 605, 610 may enable a default inter-band carrier aggregation configuration (e.g., inter-band, intra-range carrier aggregation) that is more reliable and less prone to beam failure, and may dynamically enable an inter-band, inter-range carrier aggregation configuration as-needed (e.g., on-demand) to satisfy performance requirements, to adjust to changes in channel conditions, and/or the like.

As indicated above, FIG. 6 is provided as an example. Other examples may differ from what is described with respect to FIG. 6.

Figure 7A:
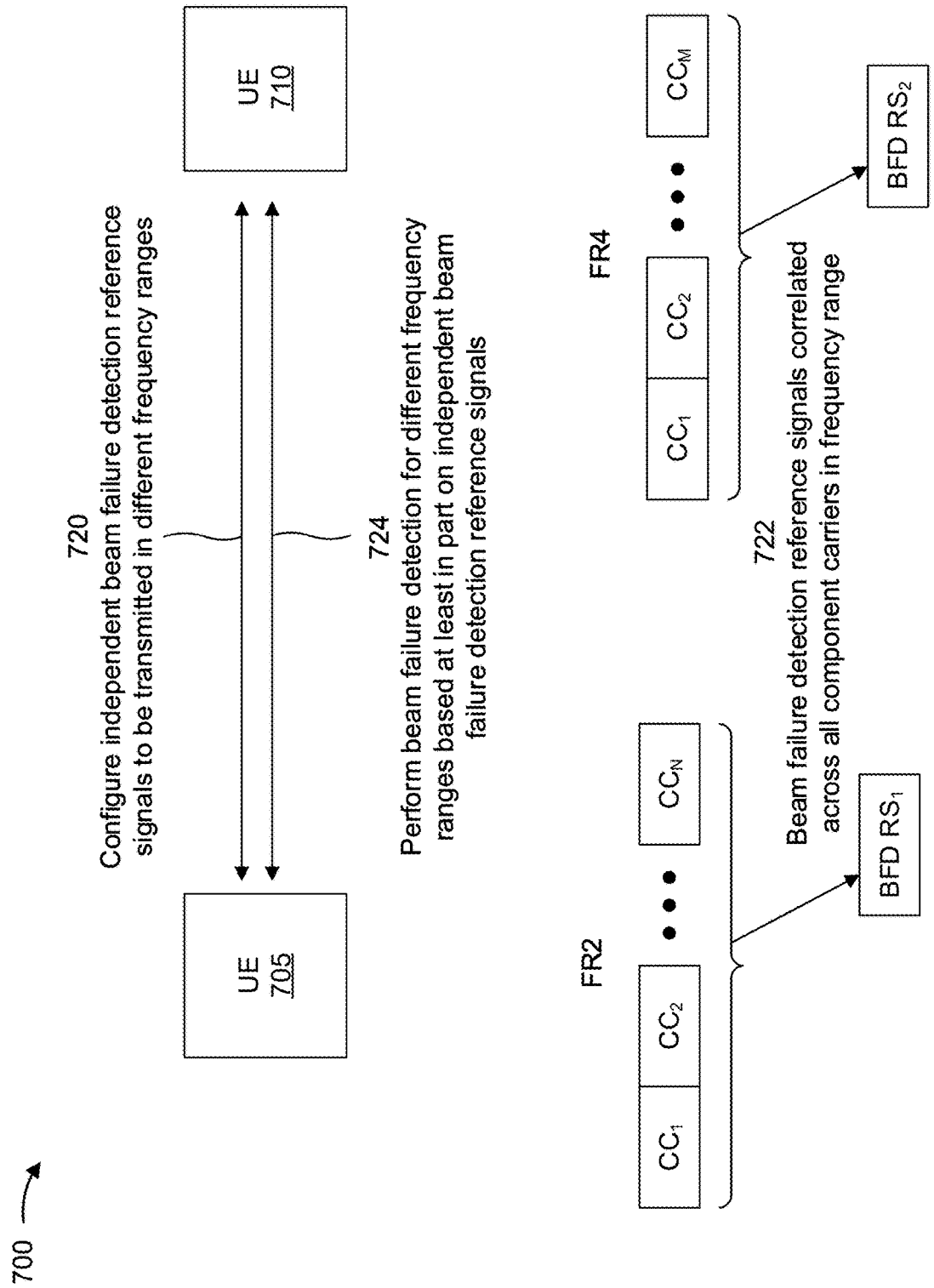
FIGS. 7A-7B are diagrams illustrating examples associated with beam failure detection with carrier aggregation in mmW sidelinks, in accordance with the present disclosure.
Figure 7B:
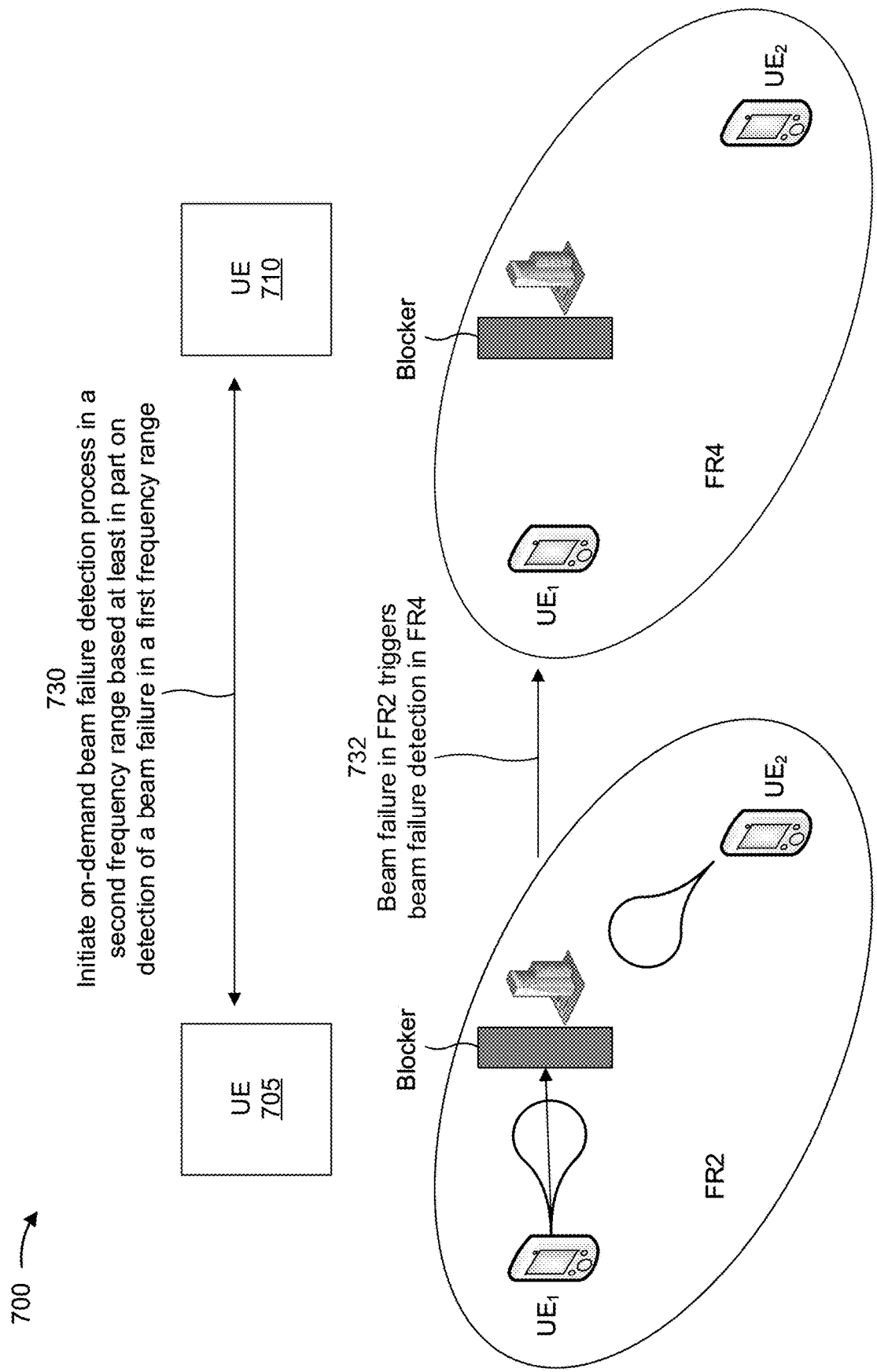

FIGS. 7A-7B are diagrams illustrating examples 700 associated with beam failure detection with carrier aggregation in mmW sidelinks, in accordance with the present disclosure. As shown in FIG. 7, example(s) 700 includes a first UE 705 and a second UE 710 communicating in a wireless network (e.g., wireless network 100). In some aspects, the UEs 705, 710 may communicate over a sidelink according to an inter-band carrier aggregation configuration that includes one or more component carriers associated with a first frequency band and one or more component carriers associated with a second frequency band. For example, in some aspects, each frequency band may correspond to an entire frequency range (e.g., FR2 or FR4), a set of one or more frequencies within a frequency range, and/or the like. Accordingly, while some aspects may be described herein in a context that relates to inter-band, inter-range carrier aggregation (e.g., FR2+FR4), it will be appreciated that the same or similar techniques may be applied to inter-band, intra-range carrier aggregation (e.g., FR2+FR2, FR4+FR4), and/or the like.

As shown in FIG. 7A, and by reference number 720, the UE 705, 710 may configure independent beam failure detection reference signals to be transmitted in different frequency ranges (or different frequency bands). For example, as described herein, the UEs 705, 710 may communicate over a beamformed link, which may include a first beam associated with the one or more component carriers in the first frequency band, a second beam associated with the one or more component carriers in the second frequency band, and/or the like. Accordingly, the first beam and the second beam may be subject to different channel properties even when the first beam and the second beam are steered toward the same or similar clusters in a channel, and a variation in the channel properties associated with the different beams may depend on a separation or distance between the component carrier(s) in the first frequency band the component carrier(s) in the second frequency band.

For example, a beamforming gain experienced over a cluster in FR2 and a beamforming gain experienced over the same cluster in FR4 may generally be frequency-dependent, and beamforming performance over the same cluster with an impairment (e.g., hand blockage) and penetration losses (e.g., due to changes in position, movement of objects, and/or the like) may also be frequency-dependent. However, variations in the frequency-dependent beamforming gain in a pre-impairment scenario are typically fairly minor, but performance loss or degradation is typically more severe at higher frequencies than lower frequencies.

Accordingly, the viability of a particular cluster (and therefore a particular beam steered toward the particular cluster) may vary across different frequency bands or ranges. For example, degradation or failure of beam in a higher frequency range (e.g., FR4) may not indicate degradation or failure of beam in a lower frequency range (e.g., FR2) because performance loss or degradation is typically more severe at higher frequencies. However, beamforming performance (e.g., beamforming gain, beam degradation, signal loss, beam failure, and/or the like) may generally be correlated across component carriers within a frequency band or within a frequency range. For example, as shown by reference number 722, the independent beam failure detection reference signals may include a first beam failure detection reference signal correlated across multiple component carriers in a first frequency range (shown as BFD $RS_1$, correlated across multiple FR2 component carriers) and a second beam failure detection reference signal correlated across multiple component carriers in a second frequency range (shown as BFD $RS_2$, correlated across multiple FR4 component carriers).

As further shown in FIG. 7A, and by reference number 724, the UEs 705, 710 may perform beam failure detection for different frequency ranges based at least in part on the independent beam failure detection reference signals. For example, as shown in FIG. 7A, the UEs 705, 710 may configure a first beam failure detection reference signal to be transmitted in one component carrier of FR2 and may configure a second beam failure detection reference signal to be transmitted in one component carrier of FR4. Accordingly, in some aspects, the beam failure process performed by the UEs 705, 710 may be correlated across all of the component carriers in FR2 based at least in part on the first beam failure detection reference signal, and the beam failure process performed by the UEs 705, 710 may be correlated across all of the component carriers in FR4 based at least in part on the second beam failure detection reference signal. In other words, the UEs 705, 710 may configure the first beam failure detection reference signal to be transmitted and received in only one component carrier of FR2 to detect beam failure in other component carriers of FR2 (e.g., $CC_1$, $CC_N$), and the UEs 705, 710 may independently configure the second beam failure detection reference signal to be transmitted and received in only one component carrier of FR4 to detect beam failure in other component carriers of FR4 (e.g., $CC_1$, $CC_M$).

In some aspects, the first UE 705 may be configured to transmit the first beam failure detection reference signal to the second UE 710, and the second UE 710 may be configured to transmit the second beam failure detection reference signal to the first UE 705, or vice versa. In some aspects, a configuration that assigns transmission and reception of the respective beam failure detection reference signals among the UEs 705, 710 may be indicated by a base station in communication with the UEs 705, 710 over an access link. Additionally, or alternatively, the UE 705, 710 may each self-determine the beam failure detection reference signals to be transmitted and received, and may indicate the self-determined reference signal configuration to each other over the sidelink. Additionally, or alternatively, the UEs 705, 710 may dynamically negotiate (e.g., mutually agree upon) which beam failure detection reference signal each UE 705, 710 is to transmit and which beam failure detection reference signal each UE 705, 710 is to receive.

For example, in some aspects, a selection of which UE 705, 710 is to transmit a beam failure detection reference signal and which UE 705, 710 is to receive a beam failure detection reference signal may depend on a network topology (e.g., whether the UEs 705, 710 are in communication with a base station, whether other UEs involved in sidelink communication with one or more of the UEs 705, 710, and/or the like). Additionally, or alternatively, a selection of which UE 705, 710 is to transmit a beam failure detection reference signal and which UE 705, 710 is to receive a beam failure detection reference signal may depend on whether the UEs 705, 710 have symmetric or asymmetric capabilities (e.g., numbers of transmit and/or receive elements and/or antenna array structures, RF chain capabilities, supported modulation and coding schemes, and/or the like), state information associated with the UEs 705, 710, and/or the like.

For example, if UE 705 is in a low-power mode and UE 710 is in a normal mode or a high-power mode, the UE 705 in the low-power mode may be configured to only receive the beam failure detection reference signals because transmitting generally has a larger power requirement. Additionally, or alternatively, one of the UEs 705, 710 may have a lower thermal budget or a higher thermal overshoot, in which case that UE may prefer to only listen (e.g., receive) because transmitting generates more heat than receiving. Furthermore, in some aspects, the component carriers in which the beam failure detection reference signals are transmitted and received may change over time (e.g., according to network topology, randomly or pseudo-randomly, and/or the like).

As further shown in FIG. 7B, and by reference number 730, the UEs 705, 710 may initiate a bi-directional, on-demand beam failure detection process in a second frequency range based at least in part on detection of a beam failure in a first frequency range. For example, as shown by reference number 732, a beam failure in FR2 may trigger a beam failure detection process in FR4, or vice versa. Additionally, or alternatively, where independent beam failure detection reference signals are configured for different frequency bands within a frequency range, a beam failure in a first frequency band may trigger a beam failure detection process in a second frequency band, or vice versa. For example, as shown in FIG. 7B, the UEs 705, 710 may be communicating using a first beam associated with a first component carrier in FR2 and using a second beam associated with a second component carrier in FR4. In some aspects, the first beam and the second beam may both be steered toward the same cluster, shown as a building in FIG. 7B.

Accordingly, in cases where the first UE 705 is configured to transmit a first beam failure detection reference signal in a component carrier of FR2, a change in channel conditions may result in beam failure in FR2. For example, an object may move into a path between the first UE 705 and the cluster that the first beam is steered toward. For example, the first UE 705 may have a frequency modulated continuous wave (FMCW) radar component or another internal sensor that can detect the presence of a hand near an antenna module. Accordingly, if the FMCW component or internal sensor(s) of the first UE 705 detect the presence of the hand that may cause an impairment to the first beam, the first UE 705 may trigger transmission of the first beam failure detection reference signal in the component carrier of FR2. For example, the first UE 705 may trigger the transmission of the first beam failure detection reference signal in the component carrier of FR2 because a beam failure in FR2 is likely to indicate a beam failure in FR4, but a beam failure in FR4 may or may not indicate a beam failure in FR2 due to the different frequency-dependent performance loss or degradation in different frequency bands. Furthermore, it will be appreciated that transmission of the first beam failure detection reference signal may be triggered by various conditions, and the presence of a hand is merely one example.

As a result, when the first UE 705 transmits the first beam failure detection reference signal, the first beam failure detection reference signal may not be received at the second UE 710, or may be received with a signal strength that fails to satisfy a threshold such that the UEs 705, 710 can no longer communicate using the beam steered toward the cluster. Accordingly, due to the second UE 710 detecting beam failure due to the first beam failure detection reference transmitted by the first UE 705 in FR2, the second UE 710 can initiate a beam failure detection reference signal transmission in FR4 to initiate an on-demand beam failure detection process in FR4. Additionally, or alternatively, the first UE 710 can initiate transmission of the beam failure detection reference signal in FR4 based at least in part on the beam failure detected by the second UE 710 in FR2. The UEs 705, 710 may then initiate a beam failure recovery process to select one or more suitable beams in the respective frequency ranges or frequency bands in which beam failure was detected. For example, in some aspects, the beam failure recovery process may be performed using contention-free or contention-based random access channel resources.

In this way, initiating a bi-directional and/or on-demand beam failure detection process in one frequency band or frequency range when a beam failure is detected in another frequency band or another frequency range may conserve significant resources (e.g., power resources, thermal budget, processor resources, time resources, and/or the like) at the UEs 705, 710. For example, beam failure detection tends to be a resource-intensive process because transmitting beam failure detection reference signals can consume power and/or generate heat that needs to be dissipated, and beam failure detection can be a lengthy process that may increase latency and/or consume additional resources (e.g., power, thermal budget, and/or the like) by prolonging the amount of time that is spent transmitting, receiving, and/or processing the beam failure detection reference signals. Furthermore, the resource-intensiveness of the beam failure detection process may be greater in a sidelink context, because resources used on a PC5 link are usually unicast resources, unlike broadcast resources used on a Uu access link. Accordingly, limiting the beam failure detection process in one or more frequency bands or frequency ranges and/or performing beam failure detection process in one or more frequency bands or frequency ranges on-demand and only as-needed may be useful in reducing the resource demands of the beam failure detection process(es).

As indicated above, FIGS. 7A-7B are provided as examples. Other examples may differ from what is described with respect to FIGS. 7A-7B.

Figure 8:
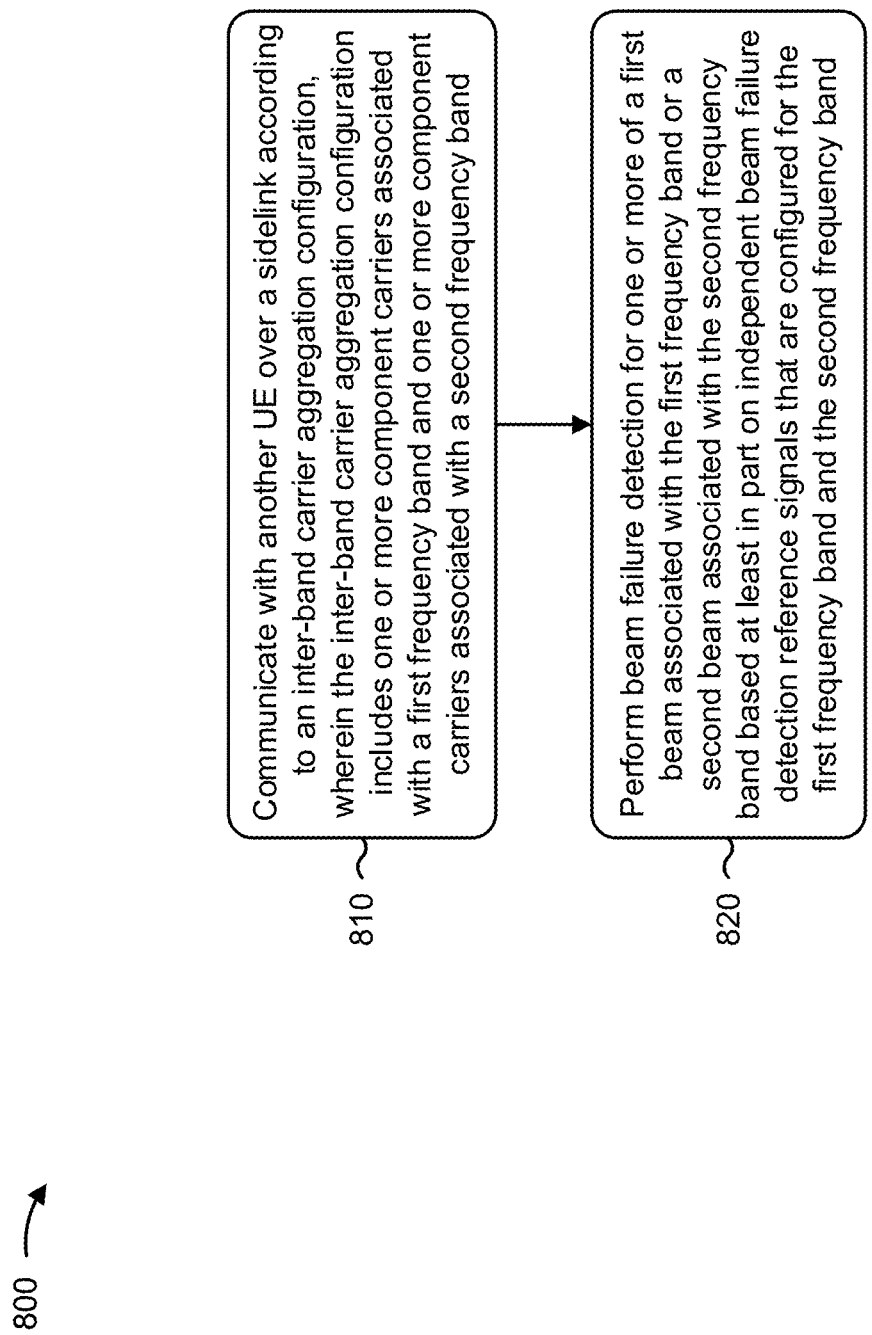
FIG. 8 is a diagram illustrating an example process associated with beam failure detection with carrier aggregation in mmW sidelinks, in accordance with the present disclosure.

FIG. 8 is a diagram illustrating an example process 800 performed, for example, by a UE, in accordance with various aspects of the present disclosure. Example process 800 is an example where the UE (e.g., UE 120, UE 405, Tx/Rx UE 505, Rx/Tx UE 510, mmW node 605, mmW node 610, UE 705, UE 710, and/or the like) performs operations associated with beam failure detection with carrier aggregation in mmW sidelinks.

As shown in FIG. 8, in some aspects, process 800 may include communicating with another UE over a sidelink according to an inter-band carrier aggregation configuration, wherein the inter-band carrier aggregation configuration includes one or more component carriers associated with a first frequency band and one or more component carriers associated with a second frequency band (block 810). For example, the UE may communicate (e.g., using antenna 252, demodulator 254, MIMO detector 256, receive processor 258, transmit processor 264, TX MIMO processor 266, modulator 254, controller/processor 280, memory 282, and/or architecture 300) with another UE over a sidelink according to an inter-band carrier aggregation configuration, as described above. In some aspects, the inter-band carrier aggregation configuration includes one or more component carriers associated with a first frequency band and one or more component carriers associated with a second frequency band.

As further shown in FIG. 8, in some aspects, process 800 may include performing beam failure detection for one or more of a first beam associated with the first frequency band or a second beam associated with the second frequency band based at least in part on independent beam failure detection reference signals that are configured for the first frequency band and the second frequency band (block 820). For example, the UE may perform (e.g., using antenna 252, demodulator 254, MIMO detector 256, receive processor 258, transmit processor 264, TX MIMO processor 266, modulator 254, controller/processor 280, memory 282, and/or architecture 300) beam failure detection for one or more of a first beam associated with the first frequency band or a second beam associated with the second frequency band based at least in part on independent beam failure detection reference signals that are configured for the first frequency band and the second frequency band, as described above.

Process 800 may include additional aspects, such as any single aspect or any combination of aspects described below and/or in connection with one or more other processes described elsewhere herein.

In a first aspect, the independent beam failure detection reference signals include a first beam failure detection reference signal to be transmitted in a first component carrier associated with the first frequency band and a second beam failure detection reference signal to be transmitted in a second component carrier associated with the second frequency band.

In a second aspect, alone or in combination with the first aspect, the first beam failure detection reference signal is correlated across multiple component carriers associated with the first frequency band and the second beam failure detection reference signal is correlated across multiple component carriers associated with the second frequency band.

In a third aspect, alone or in combination with one or more of the first and second aspects, the first beam failure detection reference signal is further correlated across the multiple component carriers associated with the second frequency band based at least in part on the first frequency band being in a lower frequency range than the second frequency band.

In a fourth aspect, alone or in combination with one or more of the first through third aspects, process 800 includes transmitting, to the other UE over the sidelink, the first beam failure detection reference signal in the first component carrier associated with the first frequency band, and receiving, from the other UE over the sidelink, the second beam failure detection reference signal in the second component carrier associated with the second frequency band.

In a fifth aspect, alone or in combination with one or more of the first through fourth aspects, one or more of the first component carrier to be used to transmit the first beam failure detection reference signal or the second component carrier to be used to transmit the second beam failure detection reference signal are configured to change over time.

In a sixth aspect, alone or in combination with one or more of the first through fifth aspects, the independent beam failure detection reference signals are transmitted by one or more of the UE or the other UE based at least in part on a network topology associated with the sidelink, capabilities associated with the UE and the other UE, or state information associated with the UE and the other UE.

In a seventh aspect, alone or in combination with one or more of the first through sixth aspects, performing the beam failure detection includes performing the beam failure detection for the first beam associated with the first frequency band based at least in part on a beam failure detection reference signal transmitted in a component carrier associated with the first frequency band, where the beam failure detection is initiated for the second beam associated with the second frequency band based at least in part on failure or degradation of the first beam.

In an eighth aspect, alone or in combination with one or more of the first through seventh aspects, the beam failure detection for the second beam is initiated based at least in part on the UE or the other UE detecting the failure or degradation of the first beam.

In a ninth aspect, alone or in combination with one or more of the first through eighth aspects, the inter-band carrier aggregation configuration assigns a higher priority to the one or more component carriers associated with the first frequency band based at least in part on the first frequency band being in a lower frequency range than the second frequency band.

In a tenth aspect, alone or in combination with one or more of the first through ninth aspects, the inter-band carrier aggregation configuration assigns the higher priority to the one or more component carriers associated with the first frequency band based at least in part on a trigger condition that includes one or more of availability of multiple component carriers in the first frequency band, a user loading in the first frequency band failing to satisfy a threshold, a low latency requirement, or a reuse factor associated with the first frequency band.

In an eleventh aspect, alone or in combination with one or more of the first through tenth aspects, communicating with the other UE according to the inter-band carrier aggregation configuration includes disabling communication via the one or more component carriers associated with the second frequency band, and enabling communication via the one or more component carriers associated with the second frequency band based at least in part on one or more trigger conditions.

In a twelfth aspect, alone or in combination with one or more of the first through eleventh aspects, the one or more trigger conditions include one or more of unavailability of multiple component carriers in the first frequency band or a user loading in the first frequency band satisfying a threshold.

In a thirteenth aspect, alone or in combination with one or more of the first through twelfth aspects, the first frequency band includes one or more frequencies in a first frequency range, and the second frequency band includes one or more frequencies in a second frequency range.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a UE, comprising: communicating with another UE over a sidelink according to an inter-band carrier aggregation configuration, wherein the inter-band carrier aggregation configuration includes one or more component carriers associated with a first frequency band and one or more component carriers associated with a second frequency band; and performing beam failure detection for one or more of a first beam associated with the first frequency band or a second beam associated with the second frequency band based at least in part on independent beam failure detection reference signals that are configured for the first frequency band and the second frequency band.

Aspect 2: The method of Aspect 1, wherein the independent beam failure detection reference signals include a first beam failure detection reference signal to be transmitted in a first component carrier associated with the first frequency band and a second beam failure detection reference signal to be transmitted in a second component carrier associated with the second frequency band.

Aspect 3: The method of Aspect 2, wherein the first beam failure detection reference signal is correlated across multiple component carriers associated with the first frequency band and the second beam failure detection reference signal is correlated across multiple component carriers associated with the second frequency band.

Aspect 4: The method of Aspect 3, wherein the first beam failure detection reference signal is further correlated across the multiple component carriers associated with the second frequency band based at least in part on the first frequency band being in a lower frequency range than the second frequency band.

Aspect 5: The method of any of Aspects 2-4, further comprising: transmitting, to the other UE over the sidelink, the first beam failure detection reference signal in the first component carrier associated with the first frequency band; and receiving, from the other UE over the sidelink, the second beam failure detection reference signal in the second component carrier associated with the second frequency band.

Aspect 6: The method of any of Aspects 2-5, wherein one or more of the first component carrier to be used to transmit the first beam failure detection reference signal or the second component carrier to be used to transmit the second beam failure detection reference signal are configured to change over time.

Aspect 7: The method of any of Aspects 1-6, wherein the independent beam failure detection reference signals are transmitted by one or more of the UE or the other UE based at least in part on a network topology associated with the sidelink, capabilities associated with the UE and the other UE, or state information associated with the UE and the other UE.

Aspect 8: The method of any of Aspects 1-7, wherein performing the beam failure detection includes: performing the beam failure detection for the first beam associated with the first frequency band based at least in part on a beam failure detection reference signal transmitted in a component carrier associated with the first frequency band, wherein the beam failure detection is initiated for the second beam associated with the second frequency band based at least in part on failure or degradation of the first beam.

Aspect 9: The method of Aspect 8, wherein the beam failure detection for the second beam is initiated based at least in part on the UE or the other UE detecting the failure or degradation of the first beam.

Aspect 10: The method of any of Aspects 1-9, wherein the inter-band carrier aggregation configuration assigns a higher priority to the one or more component carriers associated with the first frequency band based at least in part on the first frequency band being in a lower frequency range than the second frequency band.

Aspect 11: The method of Aspect 10, wherein the inter-band carrier aggregation configuration assigns the higher priority to the one or more component carriers associated with the first frequency band based at least in part on a trigger condition that includes one or more of availability of multiple component carriers in the first frequency band, a user loading in the first frequency band failing to satisfy a threshold, a low latency requirement, or a reuse factor associated with the first frequency band.

Aspect 12: The method of any of Aspects 10-11, wherein communicating with the other UE according to the inter-band carrier aggregation configuration includes: disabling communication via the one or more component carriers associated with the second frequency band; and enabling communication via the one or more component carriers associated with the second frequency band based at least in part on one or more trigger conditions.

Aspect 13: The method of Aspect 12, wherein the one or more trigger conditions include one or more of unavailability of multiple component carriers in the first frequency band or a user loading in the first frequency band satisfying a threshold.

Aspect 14: The method of any of Aspects 1-13, wherein the first frequency band includes one or more frequencies in a first frequency range, and wherein the second frequency band includes one or more frequencies in a second frequency range.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    communicating with another UE over a sidelink according to an inter-band carrier aggregation configuration, wherein the inter-band carrier aggregation configuration includes one or more component carriers associated with a first frequency band and one or more component carriers associated with a second frequency band; and
    performing beam failure detection for one or more of a first beam associated with the first frequency band based at least in part on a first set of beam failure detection reference signals that are configured for the first frequency band wherein the first set of beam failure detection reference signals are correlated across multiple component carriers associated with the first frequency band, or a second beam associated with the second frequency band based at least in part on a second set of beam failure detection reference signals that are configured for the second frequency band wherein the second set of reference signals are correlated across multiple component carriers associated with the second frequency band, wherein the first set of beam failure detection reference signals are different from the second set of beam failure detection reference signals.

2. The method of claim 1, wherein the first set of beam failure detection reference signals includes a first beam failure detection reference signal to be transmitted in a first component carrier associated with the first frequency band and the second set of beam failure detection reference signals include a second beam failure detection reference signal to be transmitted in a second component carrier associated with the second frequency band.

3. The method of claim 2, wherein the first beam failure detection reference signal is further correlated across the multiple component carriers associated with the second frequency band based at least in part on the first frequency band being in a lower frequency range than the second frequency band.

4. The method of claim 2, further comprising:
transmitting, to the other UE over the sidelink, the first beam failure detection reference signal in the first component carrier associated with the first frequency band; and
receiving, from the other UE over the sidelink, the second beam failure detection reference signal in the second component carrier associated with the second frequency band.

5. The method of claim 2, wherein one or more of the first component carrier to be used to transmit the first beam failure detection reference signal or the second component carrier to be used to transmit the second beam failure detection reference signal are configured to change over time.

6. The method of claim 1, wherein the first set of beam failure detection reference signals and the second set of beam failure detection reference signals are transmitted by one or more of the UE or the other UE based at least in part on a network topology associated with the sidelink, capabilities associated with the UE and the other UE, or state information associated with the UE and the other UE.

7. The method of claim 1, wherein performing the beam failure detection includes:
performing the beam failure detection for the first beam associated with the first frequency band based at least in part on a beam failure detection reference signal transmitted in a component carrier associated with the first frequency band, wherein the beam failure detection is initiated for the second beam associated with the second frequency band based at least in part on failure or degradation of the first beam.

8. The method of claim 7, wherein the beam failure detection for the second beam is initiated based at least in part on the UE or the other UE detecting the failure or degradation of the first beam.

9. The method of claim 1, wherein the inter-band carrier aggregation configuration assigns a higher priority to the one or more component carriers associated with the first frequency band based at least in part on the first frequency band being in a lower frequency range than the second frequency band.

10. The method of claim 9, wherein the inter-band carrier aggregation configuration assigns the higher priority to the one or more component carriers associated with the first frequency band based at least in part on a trigger condition that includes one or more of availability of multiple component carriers in the first frequency band, a low latency requirement, or a reuse factor associated with the first frequency band.

11. The method of claim 9, wherein communicating with the other UE according to the inter-band carrier aggregation configuration includes:
disabling communication via the one or more component carriers associated with the second frequency band; and
enabling communication via the one or more component carriers associated with the second frequency band based at least in part on one or more trigger conditions.

12. The method of claim 11, wherein the one or more trigger conditions include an unavailability of multiple component carriers in the first frequency band.

13. The method of claim 1, wherein the first frequency band includes one or more frequencies in a first frequency range, and wherein the second frequency band includes one or more frequencies in a second frequency range.

14. A user equipment (UE) for wireless communication, comprising:
a memory; and
one or more processors, coupled to the memory, configured to:
communicate with another UE over a sidelink according to an inter-band carrier aggregation configuration, wherein the inter-band carrier aggregation configuration includes one or more component carriers associated with a first frequency band and one or more component carriers associated with a second frequency band; and
perform beam failure detection for one or more of a first beam associated with the first frequency band based at least in part on a first set of beam failure detection reference signals that are configured for the first frequency band wherein the first set of beam failure detection reference signals are correlated across multiple component carriers associated with the first frequency band, or a second beam associated with the second frequency band based at least in part on a second set of beam failure detection reference signals that are configured for the second frequency band wherein the second set of reference signals are correlated across multiple component carriers associated with the second frequency band, wherein the first set of beam failure detection reference signals are different from the second set of beam failure detection reference signals.

15. The UE of claim 14, wherein the first set of beam failure detection reference signals includes a first beam failure detection reference signal to be transmitted in a first component carrier associated with the first frequency band and the second set of beam failure detection reference signals include a second beam failure detection reference signal to be transmitted in a second component carrier associated with the second frequency band.

16. The UE of claim 15, wherein the first beam failure detection reference signal is further correlated across the multiple component carriers associated with the second frequency band based at least in part on the first frequency band being in a lower frequency range than the second frequency band.

17. The UE of claim 15, wherein the one or more processors are further configured to:
transmit, to the other UE over the sidelink, the first beam failure detection reference signal in the first component carrier associated with the first frequency band; and
receive, from the other UE over the sidelink, the second beam failure detection reference signal in the second component carrier associated with the second frequency band.

18. The UE of claim 15, wherein one or more of the first component carrier to be used to transmit the first beam failure detection reference signal or the second component carrier to be used to transmit the second beam failure detection reference signal are configured to change over time.

19. The UE of claim 14, wherein the first set of beam failure detection reference signals and the second set of beam failure detection reference signals are transmitted by one or more of the UE or the other UE based at least in part on a network topology associated with the sidelink, capabilities associated with the UE and the other UE, or state information associated with the UE and the other UE.

20. The UE of claim 14, wherein the one or more processors, when performing the beam failure detection, are configured to:
    perform the beam failure detection for the first beam associated with the first frequency band based at least in part on a beam failure detection reference signal transmitted in a component carrier associated with the first frequency band, wherein the beam failure detection is initiated for the second beam associated with the second frequency band based at least in part on failure or degradation of the first beam.

21. The UE of claim 20, wherein the beam failure detection for the second beam is initiated based at least in part on the UE or the other UE detecting the failure or degradation of the first beam.

22. The UE of claim 14, wherein the inter-band carrier aggregation configuration assigns a higher priority to the one or more component carriers associated with the first frequency band based at least in part on the first frequency band being in a lower frequency range than the second frequency band.

23. The UE of claim 22, wherein the inter-band carrier aggregation configuration assigns the higher priority to the one or more component carriers associated with the first frequency band based at least in part on a trigger condition that includes one or more of availability of multiple component carriers in the first frequency band, a low latency requirement, or a reuse factor associated with the first frequency band.

24. The UE of claim 22, wherein the one or more processors, when communicating with the other UE according to the inter-band carrier aggregation configuration, are configured to:
    disable communication via the one or more component carriers associated with the second frequency band; and
    enable communication via the one or more component carriers associated with the second frequency band based at least in part on one or more trigger conditions.

25. The UE of claim 24, wherein the one or more trigger conditions include an unavailability of multiple component carriers in the first frequency band.

26. The UE of claim 14, wherein the first frequency band includes one or more frequencies in a first frequency range, and wherein the second frequency band includes one or more frequencies in a second frequency range.

27. A non-transitory computer-readable medium storing a set of instructions for wireless communication, the set of instructions comprising:
    one or more instructions that, when executed by one or more processors of a user equipment (UE), cause the UE to:
        communicate with another UE over a sidelink according to an inter-band carrier aggregation configuration, wherein the inter-band carrier aggregation configuration includes one or more component carriers associated with a first frequency band and one or more component carriers associated with a second frequency band; and
        perform beam failure detection for one or more of a first beam associated with the first frequency band based at least in part on a first set of beam failure detection reference signals that are configured for the first frequency band wherein the first set of beam failure detection reference signals are correlated across multiple component carriers associated with the first frequency band, or a second beam associated with the second frequency band based at least in part on a second set of beam failure detection reference signals that are configured for the second frequency band wherein the second set of reference signals are correlated across multiple component carriers associated with the second frequency band, wherein the first set of beam failure detection reference signals are different from the second set of beam failure detection reference signals.

28. The non-transitory computer-readable medium of claim 27, wherein the first set of beam failure detection reference signals includes a first beam failure detection reference signal to be transmitted in a first component carrier associated with the first frequency band and the second set of beam failure detection reference signals include a second beam failure detection reference signal to be transmitted in a second component carrier associated with the second frequency band.

29. An apparatus for wireless communication, comprising:
    means for communicating with a user equipment over a sidelink according to an inter-band carrier aggregation configuration, wherein the inter-band carrier aggregation configuration includes one or more component carriers associated with a first frequency band and one or more component carriers associated with a second frequency band; and
    means for performing beam failure detection for one or more of a first beam associated with the first frequency band based at least in part on a first set of beam failure detection reference signals that are configured for the first frequency band wherein the first set of beam failure detection reference signals are correlated across multiple component carriers associated with the first frequency band, or a second beam associated with the second frequency band based at least in part on a second set of beam failure detection reference signals that are configured for the second frequency band wherein the second set of reference signals are correlated across multiple component carriers associated with the second frequency band, wherein the first set of beam failure detection reference signals are different from the second set of beam failure detection reference signals.

30. The apparatus of claim 29, wherein the first set of beam failure detection reference signals includes a first beam failure detection reference signal to be transmitted in a first component carrier associated with the first frequency band and the second set of beam failure detection reference signals include a second beam failure detection reference signal to be transmitted in a second component carrier associated with the second frequency band.

* * * * *